July 20, 1954
T. T. VIOLETTE
2,684,164
PIPE NESTLING APPARATUS
Filed Dec. 12, 1949
2 Sheets-Sheet 2
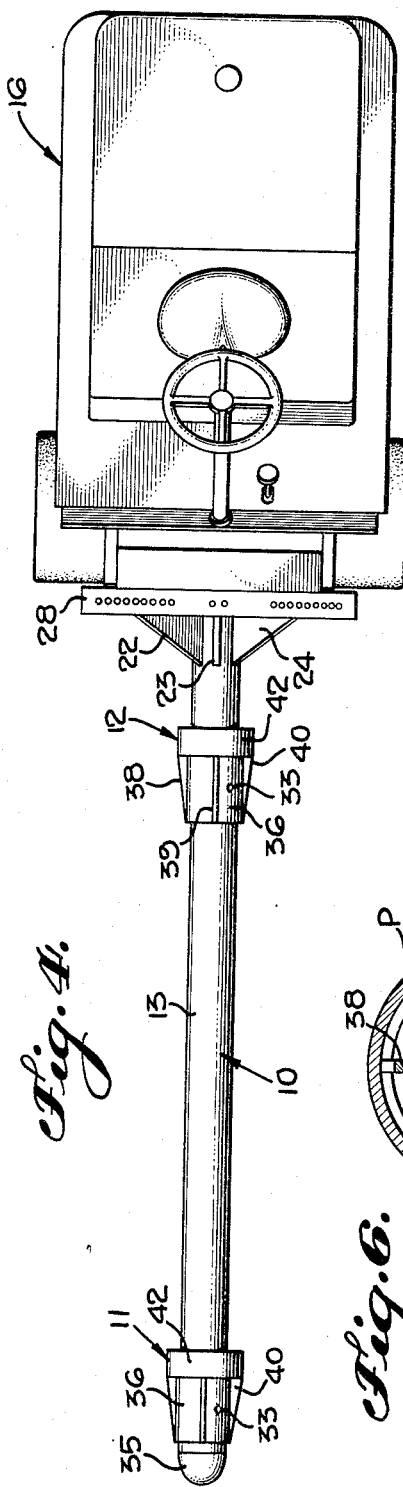
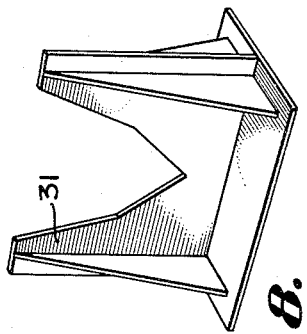
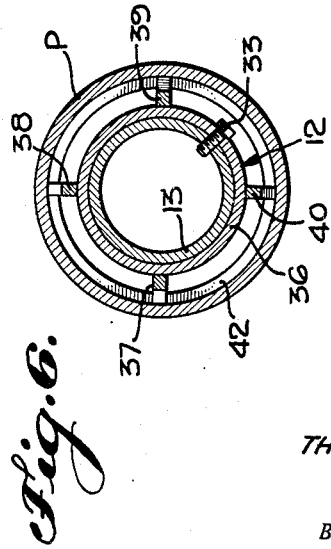
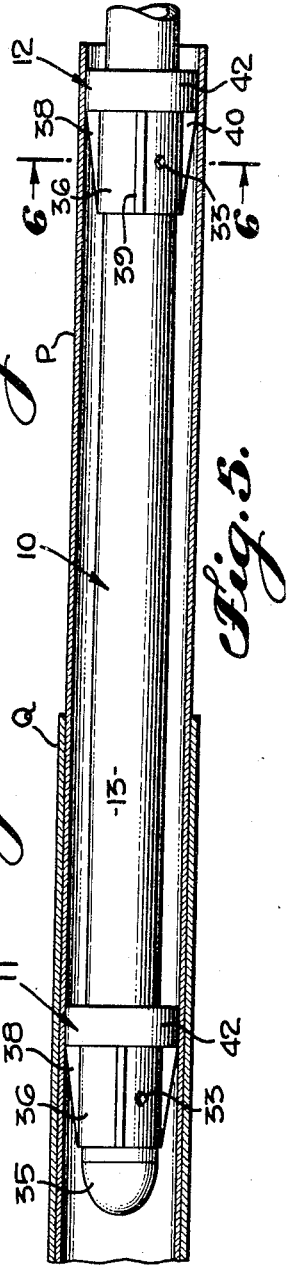
THEODORE T. VIOLETTE,
INVENTOR.
BY Lyon & Lyon
ATTORNEYS Patented July 20, 1954

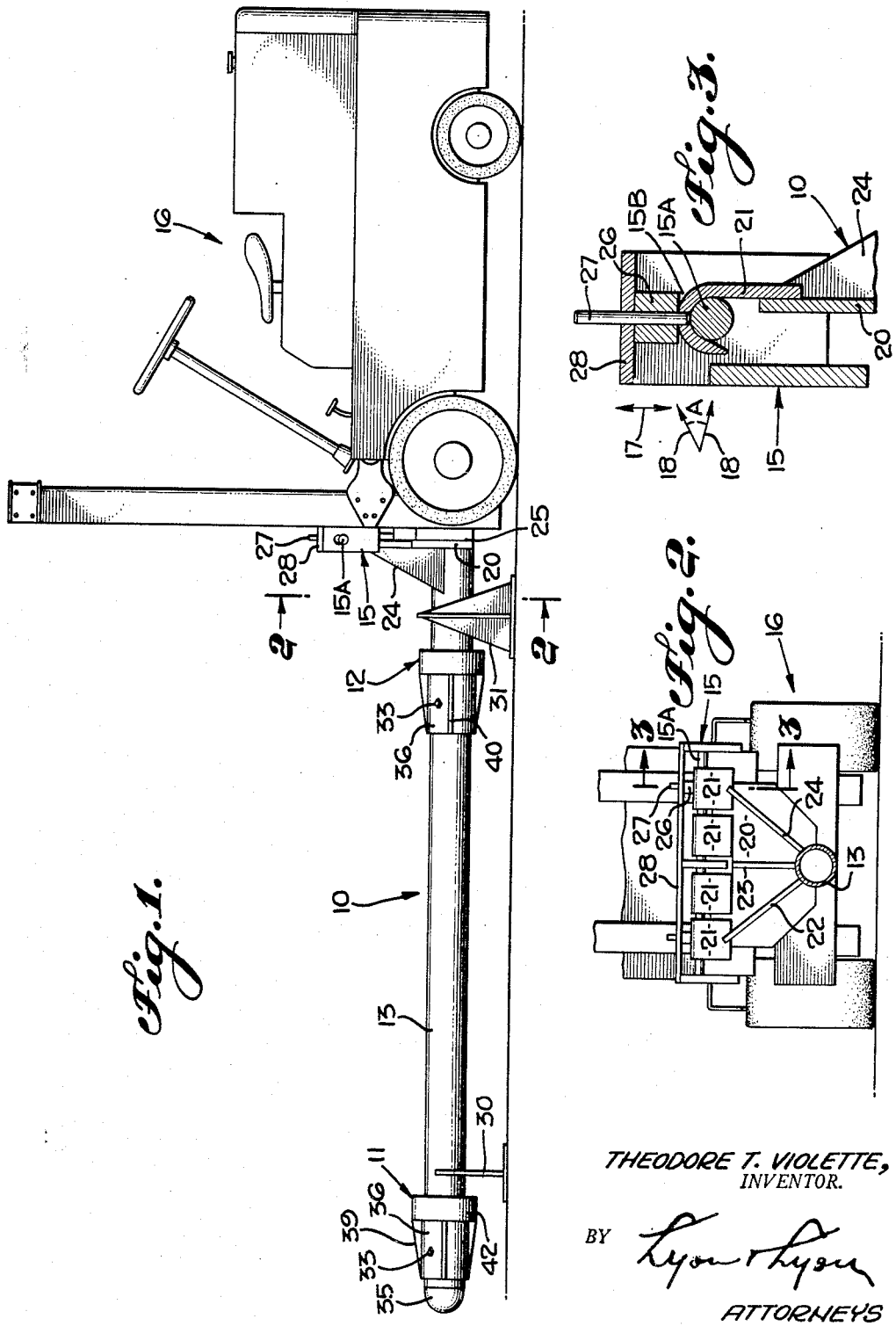

2,684,164

UNITED STATES PATENT OFFICE 2,684,164

PIPE NESTLING APPARATUS

Theodore T. Violette, Long Beach, Calif.

Application December 12, 1949, Serial No. 132,556

3 Claims. (Cl. 214—620)

The present invention relates to an improved technique and apparatus for handling pipe.

In preparing pipe for shipment and storage, it is conventional practice to nestle smaller diameter pipe into larger diameter pipe, for obvious reasons, the most important being to minimize space requirements. This is particularly true in making water shipments of many large lengths of oil well drill pipe. Since such oil well pipe lengths are rather long and heavy, they heretofore required much effort on the part of a relatively large number of workmen to nestle the pipes one within the other.

It is therefore an object of the present invention to provide an improved technique and apparatus for accomplishing the above indicated purpose, characterized by the fact that the services of only one individual is required and that the process of nestling the pipes takes a much shorter period of time.

Another object of the present invention is to provide an improved apparatus of this character which is readily adaptable to existing hydraulically operated vehicles of the lifting fork type.

Another object of the present invention is to provide an improved apparatus of this character which is not only capable of conveniently and quickly accomplishing the above indicated result, but which is also effective to transport long lengths of pipe from one location to another.

A further object of the present invention is to provide an improved apparatus of this character which is readily adapted for transporting and nestling different diameter pipe.

Yet a further object of the present invention is to provide an improved apparatus of this character in the form of an accessory or supplemental equipment with conventional lifting fork vehicles, the apparatus being characterized by the fact that the vehicle may be readily and quickly converted to perform its usual function or the desired function indicated above.

Yet a further object of the present invention is to provide an improved system for handling and nestling long lengths of pipe, the system being characterized by the fact that the services of only one person are required, and such one person is in a safe position thereby avoiding serious accidents which have heretofore occurred when such long lengths of pipe had to be handled manually by a large number of men.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings in which:

Figure 1 is a view in side elevation of the apparatus embodying features of the present invention shown in position for mounting on a conventional lifting fork type of vehicle, Figure 2 is a view taken substantially in the direction indicated by the arrows 2—2 in Figure 1, Figure 3 is a sectional view taken substantially on the line 3—3 of Figure 2, Figure 4 is a top plan view of the vehicle shown in Figure 1 but with the auxiliary boom mounting structure removed, Figure 5 is a transverse sectional view through a pair of outer pipes with the boom shown in Figure 4 within the pipe of smaller diameter and in the process of moving such pipe of smaller diameter in nestled relationship within the larger diameter pipe, Figure 6 is a sectional view taken substantially on the line 6—6 of Figure 5, and Figures 7 and 8 are perspective views of the auxiliary boom supporting members shown in elevation in Figure 1.

In accordance with the present invention there is provided a boom 10 with adaptors 11, 12 releasably mounted on the cylindrical pipe 13, this boom 10 being releasably secured to a frame member 15 of a conventional lift truck 16, the frame 15 being an element of the conventional lift truck 16 and arranged, in conventional fashion, to be both raised and tilted, by conventional mechanism, with respect to the longitudinal axis of the vehicle 16.

The mechanism for lowering and tilting the frame member 15 forms per se no part of the present invention, and may be of the construction found on present day lift trucks which are used to lift and transport articles on pallet boards. As a matter of fact, the vehicle 16 is such a device for lifting and transporting pallet boards, but the forwardly disposed forks normally found on such trucks and adapted to be inserted under a pallet board, to contact the same upon upward movement of the frame 15, is removed to allow attachment of the boom structure 10 in such a manner that the boom 10 may be raised and lowered and also tilted with respect to its longitudinal axis corresponding to the longitudinal axis of the truck 16.

The movable frame 15, which is movable vertically, as indicated by the arrows 17 in Figure 3, and which is tiltable through an angle, as indicated by the angle A between the arrows 18 in Figure 3, releasably supports the boom structure 10 on the circular crossbar 15A, forming a part of such movable frame 15. For this purpose the boom structure 10 includes an integrally formed welded plate 20 to which is welded a plurality of hooks 21 adapted to partially embrace the circular bar 15A. These hooks 21, comprising four in number as shown in Figure 2, support substantially all of the weight of the boom structure and the pipes which may be carried on such boom structure.

This vertical plate 20 is welded to the end of the cylindrical boom pipe 13; and to make the structure more rigid, three webs 22, 23 and 24 are welded between the boom pipe 13 and the plate 20. The plate 20, as shown in Figure 1, provides a flat bearing surface designated by the line 25 in Figure 1 for contacting the cooperating adjacent face of the frame member 15. In other words, although the particular connection between the frame member 15A and the hook 21 (Figure 3) allows some pivotal movement of the boom structure 10 in the counterclockwise direction in Figure 1, such pivotal movement is limited by the plate 20 bearing against the frame 15 along the line 25 in Figure 1.

In order to assure a rigid connection between the boom structure 10 and the vehicle frame member 15, there is provided, as shown in Figure 3, a removable spacer and blocking member 26, disposed between the hook 21 and the upper cross member 28 of the movable frame 15; also, a removable pin 27 extends through aligned apertures in such cross member 28, spacer 26 and hook 21, to contact the upper side of the circular frame bar 15A.

It is noted that the vertical distance between the circular bar 15A and the upper frame member 28 is greater than the vertical projection of the encircling portion of the hook 21, so as to allow such hook 21 to pass through the space 15B and bar 28, whereby the hook 21 may cooperate with the bar 15A, as shown in Figure 3. In assembling the boom member 10 on the movable frame 15 auxiliary stirrups 30 and 31 are used. Initially such boom member 10 rests on the stirrups 30, 31, as shown in Figure 1. Then the truck 16 is moved adjacent the vertical plate 20 of the boom with the frame member 15 in an adjusted vertical position to allow the hook 21 welded to such plate 20 to pass through the space occupied by the spacer 26, shown in Figure 3. Thereafter, with the plate 20 in close engagement with the adjacent face of the frame 15, the frame 15 is moved vertically by the conventional mechanism incorporated in the truck 16, whereupon the cross-bar 15A is raised to a position abutting the hook 21, as shown in Figure 3. Then the spacer 26 and pin 27 are inserted in turn to lock the hook 21 to the frame 15. Subsequently, the frame 15 is moved vertically an additional distance to move the boom 10 upwardly and take the weight of the boom off the stirrups 30, 31 which then serve no useful purpose.

The boom 10 is thus mounted for its intended purpose of conveying pipe and nestling pipes of smaller diameter inside of pipes of larger diameter. Adaptors 11, 12 are releasably mounted on the boom structure 10, such adaptors 11, 12 being one of a plurality of pairs of such adaptors and having external diameters somewhat less than the internal diameter of the pipe intended to be conveyed. There adaptors 11, 12 are releasably secured to the boom pipe 13 by a bolt 33, as shown in Figure 6.

These adaptors 11, 12, as well as the forward free end of the boom pipe 13, are of special structure and configuration to facilitate the movement of the boom 10 into a pipe. For this purpose there is welded to the free end of the boom pipe 13 a rounded ovigal nose 35; and, each of the adaptors 11, 12, constructed identically, have a sleeve 36 (Figure 6) of slightly larger internal diameter than the external diameter of the boom pipe 13, the sleeve 36 having welded thereto four tapered ribs 37, 38, 39, 40 to which, in turn, is welded a ring 42 of desired diameter. In all of the adaptors the sleeve 36 is of the same size, but the outer rings 42 are of different sizes and of external diameters somewhat less than the internal diameter of the pipe with which such adaptors are intended to be used.

The apparatus described hereinabove has been used to successfully pick up, convey and nestle oil well drill pipe of lengths greater than three times the length of the lift truck 16.

In operation, assuming that the pipe length P is lying along the ground, the frame member 15 is moved practically to its lowermost position (by conventional means not shown) and the vehicle is driven in the longitudinal direction of such pipe to cause the boom structure 10 to enter the pipe, it being noted that the rounded nose 35 and tapered adaptors 11, 12 serve to guide the movement of the pipe onto the boom 10. The boom 10 is thus driven into the pipe until the forward end of such pipe length practically abuts the reinforcing ribs 22, 23 and 24. At this stage the movable frame member 15 and attached boom 10 are raised and the forward end of the boom 10 is tilted upwardly for convenient carrying of such pipe length P. Such pipe length P may then be stacked with other pipe lengths or may be nestled within a larger pipe Q, as shown in Figure 5. After the pipe P is stacked or nestled, as the case may be, the vehicle 16 is simply placed in reverse to travel in a reverse direction, whereupon the boom structure 10 slides out of the pipe P.

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

I claim:

1. In apparatus of the character described, including a lift truck of the type having a frame member movable vertically and tiltable vertically about a horizontal axis extending transversely of the vehicle, a boom structure mounted on said frame member with the axis of the boom extending in the longitudinal direction of the vehicle, the improvement which resides in providing said boom structure with an elongated tubular element having a forward rounded nose, and quickly attachable and detachable mandrils mounted on said tubular element, said mandrils having sleeves of internal diameter slightly greater than the external diameter of said tubular member and having enlarged collars integrally connected with said sleeves by tapered webs, said tapered webs being tapered radially inwardly of said tubular member in the direction of its free end, said boom structure having mounted thereon a bearing plate adapted to contact said frame member on a large extended area and at least one hook positioned on said bearing plate above the longitudinal axis of said boom structure.

2. In apparatus of the character described, the combination with a vehicle having a frame member movable vertically and pivoted about a horizontal axis extending transversely of said vehicle, said frame member having a bar extending transversely of said vehicle, a boom structure comprising an elongated tubular member extending along the longitudinal axis of said vehicle, said tubular element having its end remote from said vehicle rounded, a plurality of mandrils quickly attachably and detachably mounted on said tubular member, the end of said tubular element adjacent said vehicle being connected to a vertical plate, the upper end of said vertical plate having hooks thereon above the longitudinal axis of said boom structure adapted to hook over said frame bar, said movable frame having an extended area adapted to contact said vertical plate of said boom structure to limit rotational movement of said hook on said bar.

3. In apparatus of the character described, a boom structure comprising an elongated circular cross-sectioned member having one of its ends rounded, a plurality of mandrils quickly attachably and detachably mounted on said member, said mandrils each comprising a sleeve on said member and a collar of diameter greater than said sleeve joined to said sleeve through tapered ribs which taper radially inwardly in the direction of the rounded end of said member, the other end of said member having joined thereto a plate having its plane extending in the radial direction of said member, and the upper end of said plate carrying hooks which are disposed above the longitudinal axis of said boom structure.

References Cited in the file of this patent

UNITED STATES PATENTS

| Number | Name | Date |
|---|---|---|
| 2,198,644 | Wettengel | Apr. 30, 1940 |
| 2,386,759 | Ulm | Oct. 16, 1945 |
| 2,477,167 | Bliss | July 26, 1949 |